US012766986B2

(12) United States Patent
Reis et al.

(10) Patent No.: US 12,766,986 B2
(45) Date of Patent: Oct. 20, 2026

(54) ON-BOARD CHARGER WITH SIMULTANEOUS CHARGE AND DISCHARGE CAPABILITY

(71) Applicant: BorgWarner US Technologies LLC, Wilmington, DE (US)

(72) Inventors: Alexandre M S Reis, Westfield, IN (US); Sunil Sreedhar, Westfield, IN (US); Abhishek Vijay Danekar, Kokomo, IN (US)

(73) Assignee: BorgWarner US Technologies LLC

( * ) Notice: Subject to any disclaimer, the term of this patent is extended or adjusted under 35 U.S.C. 154(b) by 855 days.

(21) Appl. No.: 18/115,716

(22) Filed: Feb. 28, 2023

(65) Prior Publication Data

US 2024/0286506 A1 Aug. 29, 2024

(51) Int. Cl.

| | |
|---|---|
| ***H02J 7/00*** | (2026.01) |
| ***B60L 53/22*** | (2019.01) |
| ***B60L 55/00*** | (2019.01) |
| ***H02J 3/32*** | (2006.01) |
| ***H02J 7/14*** | (2006.01) |
| ***H02M 7/797*** | (2006.01) |

(52) U.S. Cl.

CPC ............... *B60L 53/22* (2019.02); *B60L 55/00* (2019.02); *H02J 3/322* (2020.01); *H02M 7/797* (2013.01); *B60L 2210/10* (2013.01); *B60L 2210/40* (2013.01)

(58) Field of Classification Search

CPC ...... B06L 53/22; B60L 55/00; B60L 2210/10; B60L 2210/40; H02J 3/322; H02M 7/797

USPC .......................................................... 320/109

See application file for complete search history.

(56) References Cited

U.S. PATENT DOCUMENTS

| | | | | |
|---|---|---|---|---|
| 8,682,495 | B2 * | 3/2014 | Carralero | G06F 1/26 700/286 |
| 9,263,968 | B2 * | 2/2016 | Potts | H02J 50/70 |
| 11,383,607 | B1 * | 7/2022 | Prasad | B60L 53/24 |
| 2012/0249065 | A1 * | 10/2012 | Bissonette | B60L 53/665 320/109 |
| 2013/0271148 | A1 * | 10/2013 | Maeda | G01R 31/392 324/426 |
| 2015/0054466 | A1 * | 2/2015 | Kinomura | B60L 58/13 320/134 |

(Continued)

FOREIGN PATENT DOCUMENTS

WO 2022162964 A1 8/2022

OTHER PUBLICATIONS

EP Search Report for corresponding EP Application No. 24160158. 2-1009 mailed Aug. 30, 2024, 8 pgs.

*Primary Examiner* — Alexis B Pacheco

(74) *Attorney, Agent, or Firm* — Dickinson Wright PLLC

(57) ABSTRACT

An electronic circuit includes a power factor correction and inverter stage electrically connected to a power source. The power factor correction and inverter stage includes at least one relay. The electric circuit also includes an isolated direct current to direct current converter stage configured to convert power from the power factor correction and inverter stage and to provide the converted power to a load. The power factor correction and inverter stage is configured to selectively direct power from the power source to the isolated direct current to direct current converter stage and at least one power outlet.

19 Claims, 7 Drawing Sheets

(56) References Cited

U.S. PATENT DOCUMENTS

| | | | | |
|---|---|---|---|---|
| 2015/0097525 | A1* | 4/2015 | DeDona | B60L 1/006 320/109 |
| 2015/0367735 | A1* | 12/2015 | Baker | H02M 3/1582 307/10.1 |
| 2016/0016479 | A1* | 1/2016 | Khaligh | H02M 1/4258 336/170 |
| 2016/0200213 | A1* | 7/2016 | Wolf | G01R 31/396 903/907 |
| 2017/0008413 | A1* | 1/2017 | Reineccius | H02J 3/381 |
| 2017/0320396 | A1* | 11/2017 | Kim | B60L 58/12 |
| 2020/0062138 | A1* | 2/2020 | Smolenaers | B60L 55/00 |
| 2020/0171955 | A1* | 6/2020 | Bae | H02J 13/00004 |
| 2021/0155104 | A1* | 5/2021 | Skutt | H02J 7/0042 |
| 2021/0188106 | A1* | 6/2021 | Asa | H02M 1/4216 |
| 2021/0221249 | A1 | 7/2021 | Ge et al. | |
| 2022/0032781 | A1* | 2/2022 | Veltman | B60L 50/60 |
| 2022/0379760 | A1* | 12/2022 | Pathipati | B60L 53/65 |
| 2023/0025134 | A1* | 1/2023 | Kim | H02M 1/4233 |
| 2023/0378789 | A1* | 11/2023 | Cesiel | H02J 7/02 |

* cited by examiner

ON-BOARD CHARGER WITH SIMULTANEOUS CHARGE AND DISCHARGE CAPABILITY

TECHNICAL FIELD

This disclosure relates to vehicles, and in particular, to vehicles having on-board battery chargers with simultaneous charge and discharge capabilities.

BACKGROUND

Vehicles, such as cars, trucks, sport utility vehicles, crossovers, mini-vans, or other suitable vehicles, typically include various electric components, such as motors (e.g., permanent magnet motors or other suitable electric motors), batteries, battery chargers, and the like. Such electric components may be used for various aspects of vehicle control or operation, such as vehicle prolusion or other suitable aspects of vehicle control or operation.

Such vehicles may include electric vehicles (EV), which are becoming more popular (e.g., due to increased fuel costs and more strict standards for fuel emissions). Such EVs may use a variety of batteries, including high voltage batteries, to propel the EV and/or provide power to various electrical components of the EV. Other applications for using vehicle batteries are emerging, such as energy storage and backup generators. The on-board charger (OBC) has a dual purpose: (i) to provide a bidirectional system that converts alternating current (AC) voltage to direct current (DC) voltage in charging mode and (ii) to convert DC to AC in discharge or inverter mode. Typically, charge mode is used to convert power from an electrical grid (e.g., AC power) into DC voltage to charge the vehicle high voltage (HV) battery and in discharge or inverter mode converters the HV battery DC voltage into AC voltage that may be provided back to the grid, be supplied as a back generator to power electrical components of a house or other suitable electrical components when the grid is down, and/or as an inverter to supply voltage to vehicle AC outlets.

SUMMARY

This disclosure relates generally to discrete relay driver circuits.

An aspect of the disclosed embodiments includes an electronic circuit that includes a power factor correction and inverter stage electrically connected to a power source. The power factor correction and inverter stage includes at least one relay. The electric circuit also includes an isolated direct current to direct current converter stage configured to convert power from the power factor correction and inverter stage and to provide the converted power to a load. The power factor correction and inverter stage is configured to selectively direct power from the power source to the isolated direct current to direct current converter stage and at least one power outlet.

Another aspect of the disclosed embodiments includes a charging circuit that includes a power factor correction and inverter stage electrically connected to a power source. The power factor correction and inverter stage includes a main power factor correction and inverter stage and an auxiliary power factor correction and inverter stage. The auxiliary power factor correction and inverter stage includes at least one relay. The charging circuit also includes an isolated direct current to direct current converter stage configured to convert power from the power factor correction and inverter stage and to provide the converted power to a load. The main power factor correction and inverter stage provides at least some of the power from the power source to the isolated direct current to direct current converter stage. Responsive to the at least one relay being in an open state, the main power factor correction and inverter stage and the auxiliary power factor correction and inverter stage provide at least some of the power from the power source to at least one power outlet.

Another aspect of the disclosed embodiments includes a vehicle battery charging system that includes a power factor correction and inverter stage electrically connected to a power source and including a main power factor correction and inverter stage and an auxiliary power factor correction and inverter stage. The auxiliary power factor correction and inverter stage includes at least one relay. The vehicle battery charging system also includes an isolated direct current to direct current converter stage configured to convert power from the power factor correction and inverter stage and to provide the converted power to a load. The main power factor correction and inverter stage provides at least some of the power from the power source to the isolated direct current to direct current converter stage. The vehicle battery charging system also includes a controller configured to selective position the at least one relay in a first state and a second state, wherein, responsive to the at least one relay being in the second state, and voltage at the power source being the same as a voltage demand at least one power outlet, the power from the power source is provided to at least one power outlet, and, responsive to the at least one relay being in the first state, the main power factor correction and inverter stage and the auxiliary power factor correction and inverter stage provide at least some power from the power source to the at least one power outlet.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
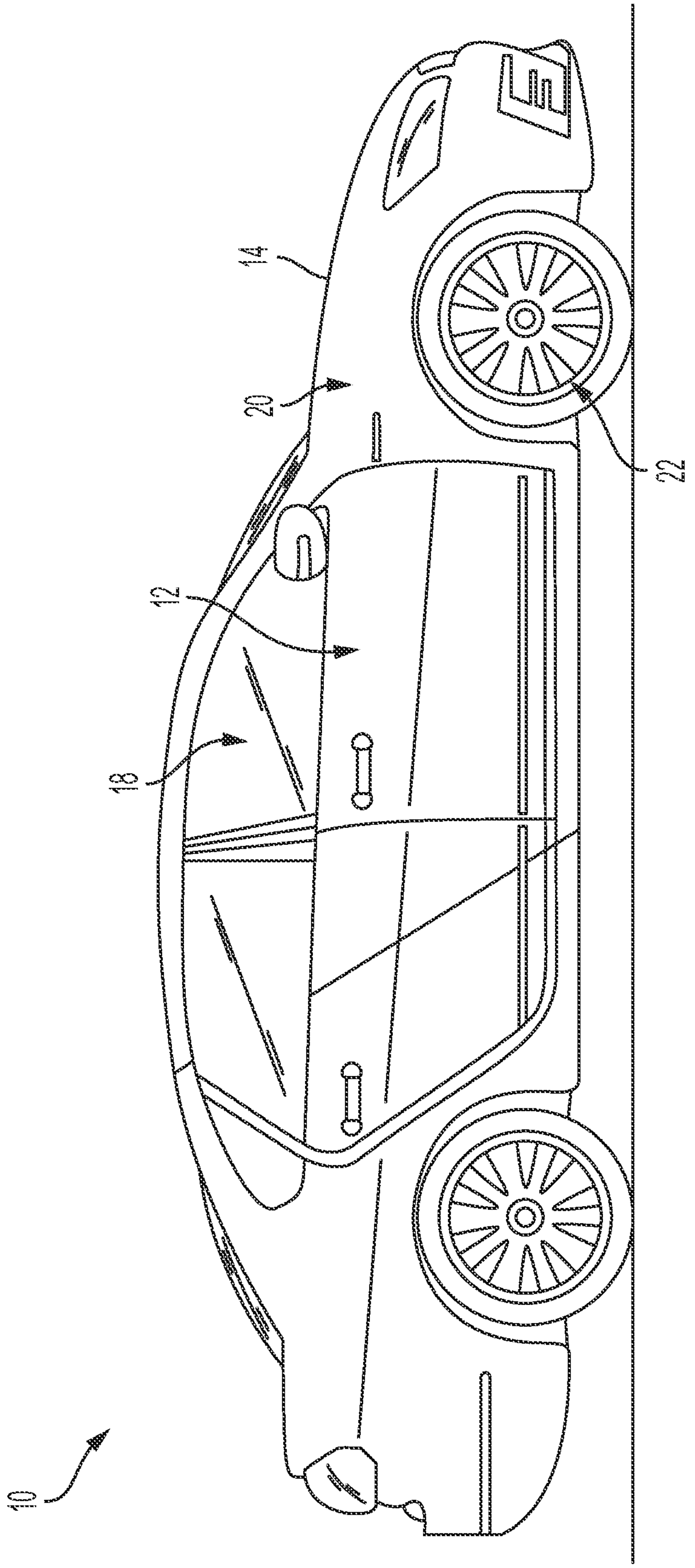
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, cross-overs, mini-vans, or other suitable vehicles, typically include various electric components, such as motors (e.g., permanent magnet motors or other suitable electric motors), batteries, battery chargers, and the like. Such electric components may be used for various aspects of vehicle control or operation, such as vehicle prolusion or other suitable aspects of vehicle control or operation.

Such vehicles may include electric vehicles (EV), which are becoming more popular (e.g., due to increased fuel costs and more strict standards for fuel emissions). Such EVs may use a variety of batteries, including high voltage batteries, to propel the EV and/or provide power to various electrical components of the EV. Other applications for using vehicle batteries are emerging, such as energy storage and backup generators. The on-board charger (OBC) has a dual purpose: (i) to provide a bidirectional system that converts alternating current (AC) voltage to direct current (DC) voltage in charging mode and (ii) to convert DC to AC in discharge or inverter mode. Typically, charge mode is used to convert power from an electrical grid (e.g., AC power) into DC voltage to charge the vehicle high voltage (HV) battery and to discharge or inverter mode converters the HV battery DC voltage into AC voltage that may be provided back to the grid, be supplied as a back generator to power electrical components of a house or other suitable electrical components when the grid is down, and/or as an inverter to supply voltage to vehicle AC outlets.

Typical OBC systems lack the ability to charge and discharge simultaneously (e.g., which may allow an EV to charge its HV battery and generate AC at different voltage level, such as 120 volts root mean square (Vrms) and 240 Vrms, or other suitable voltage levels. Accordingly, systems and methods, such as those described herein, configured to provide an OBC system configured to charge and discharge simultaneously or substantially simultaneously, may be desirable. In some embodiments, the systems and methods described herein may be configured to provide flexibility in the power factor stage of the OBC, be able to generate simultaneous charge and discharge, and/or increase power density by multi-purpose usage of some components decreasing component count.

The systems and methods described herein may be configured to combine an OBC and an isolated inverter into one circuit. The systems and methods described herein may be configured to use the same isolated converter stage for charge or discharge operation, which may increase the system power density by reducing component count. The systems and methods described herein may be configured to provide a power factor correction stage having a relatively more flexible ability to use main and auxiliary stages in parallel, which may allow up to a six-leave, interleaved stages when the auxiliary stage is not operating in inverter mode. The auxiliary stage may be lower power capable than then the main stage, which may allow for relatively faster switching devices relatively higher efficiency when the OBC operates at lower power by running only the auxiliary stage.

The systems and methods described herein may be configured to implement leaf shedding for both main and auxiliary stages for different operation power levels. The systems and methods described herein may be configured to reduce the conduction loss in slow commutating metal-oxide-semiconductor field-effect transistors (MOSFET) when the simultaneous charge and discharge operation is taking place as the net current flowing though the MOSFET is reduced due to an opposite direction of the current. For example, the current flowing at a specific time in charging may be 30 amperes (A) and the current in discharge/inverter may be 20 A. The net current flowing through the MOSFET may be 10 A.

The systems and methods described herein may be configured to, without any power conversion, use bridge relays to provide the same grid voltage to a vehicle outlet. The systems and methods described herein may be configured to use various fuses in the path to protect the OBC to protect against a short circuit (e.g., caused by a load connected to the vehicle outlet) as the relays are providing an uncontrolled current path (e.g., which may provide a relatively efficient path with relatively low loss). The systems and methods described herein may be configured to use the main power factor correction stage to meet a forward charging load demand and the auxiliary power factor correction stage to generate required AC output voltage at a single outlet or multiple outlets in the vehicle.

In some embodiments, an electronic circuit (e.g., such as an OBC) may include a power factor correction and inverter stage electrically connected to a power source. The power source may include an electrical power grid and/or other suitable power source. The power factor correction and inverter stage may include at least one relay. The electric circuit may also include an isolated direct current to direct current converter stage that may be configured to convert power from the power factor correction and inverter stage and to provide the converted power to a load. The load may include any suitable load, including, but not limited to, a vehicle battery, such as a high voltage battery or other suitable vehicle battery.

The power factor correction and inverter stage may be configured to selectively direct power from the power source to the isolated direct current to direct current converter stage and at least one power outlet. The at least one power outlet may include at least one vehicle power outlet and/or any other suitable power outlet. The power factor correction and inverter stage may include a main power factor correction and inverter stage and an auxiliary power factor correction and inverter stage. The main power factor correction and inverter stage may provide at least some of the power from the power source to the isolated direct current to direct current converter stage. The main power factor correction and inverter stage may include at least one fast commutation MOSFET and at least one slow commutation MOSFET.

The at least one relay may be disposed is the auxiliary power factor correction and inverter stage. In some embodiments, responsive to the at least one relay being in an open state, the main power factor correction and inverter stage and the auxiliary power factor correction and inverter stage may provide at least some of the power from the power source to the at least one power outlet. Additionally, or alternatively, responsive to the at least one relay being in a second state, the auxiliary power factor correction and inverter stage may provide at least some power from the load to the at least one power outlet.

FIG. 1 generally illustrates a vehicle 10 according to the principles of the present disclosure. The vehicle 10 may include any suitable vehicle, such as a car, a truck, a sport utility vehicle, a mini-van, a cross-over, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 is disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles which turns wheels 22. When the vehicle 10 includes one or more electric motors, a vehicle battery and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
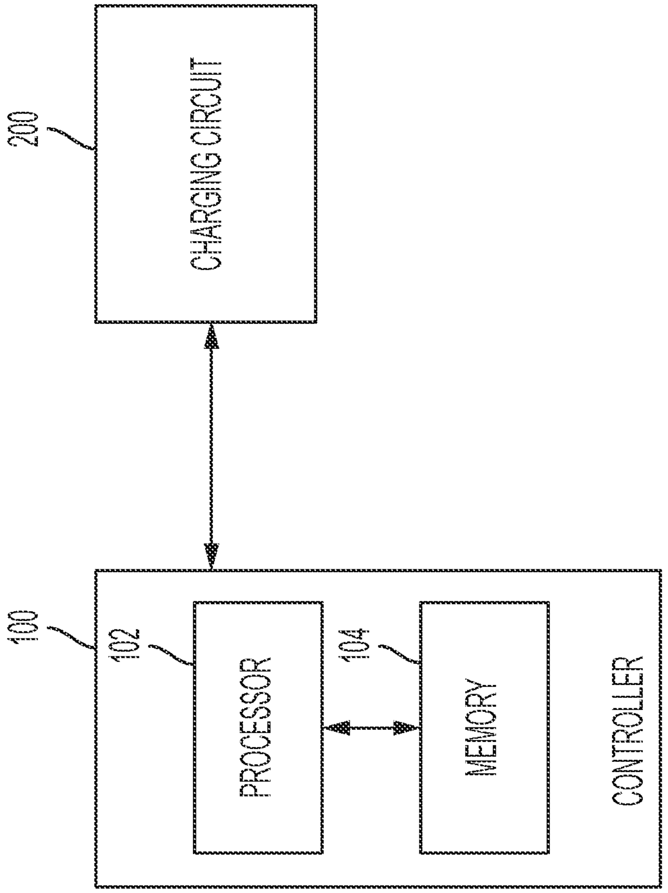
FIG. 2 generally illustrates a controller according to the principles of the present disclosure.
Figure 3:
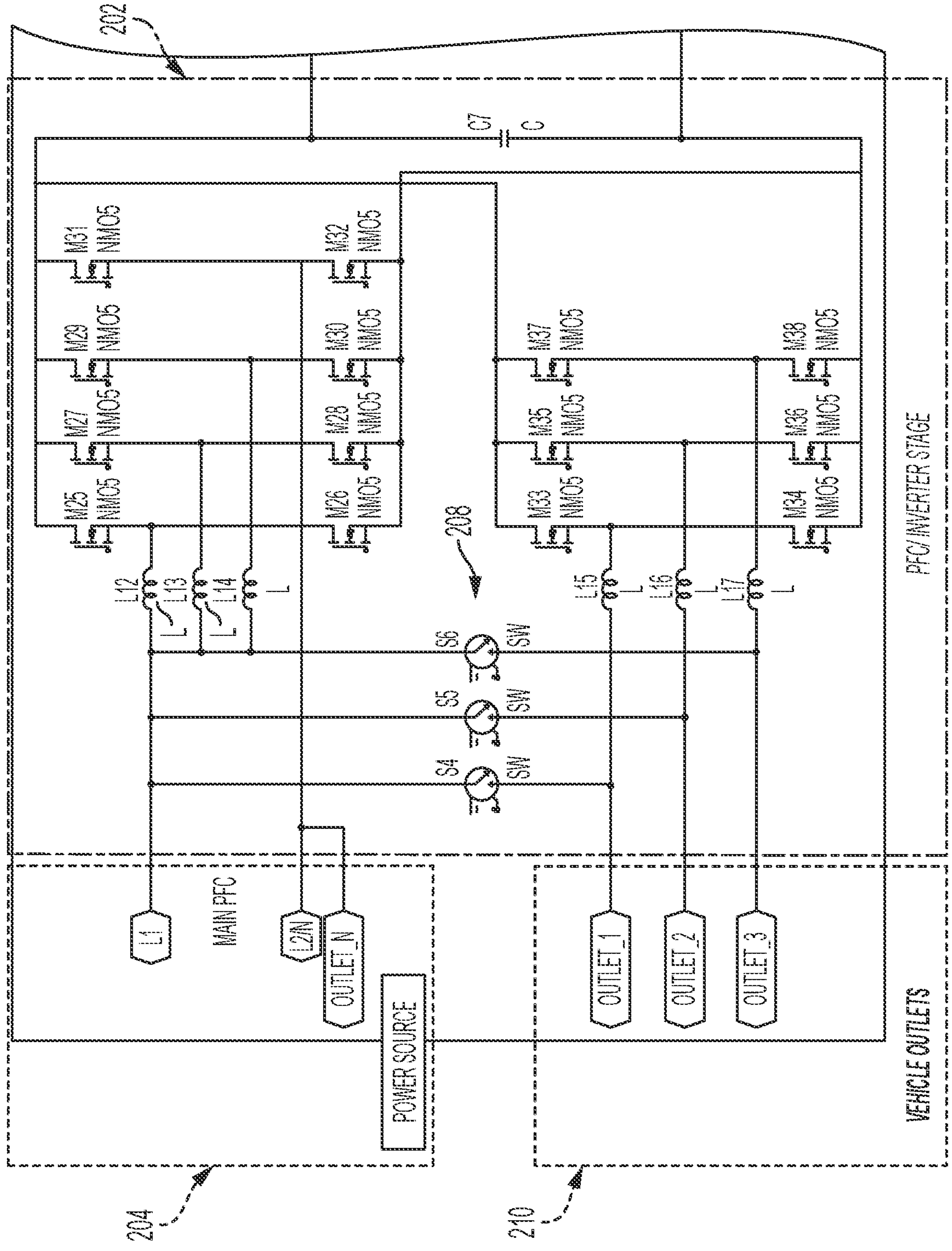
FIGS. 3-6 generally illustrate an on-board charging circuit according to the principles of the present disclosure.
Figure 3:
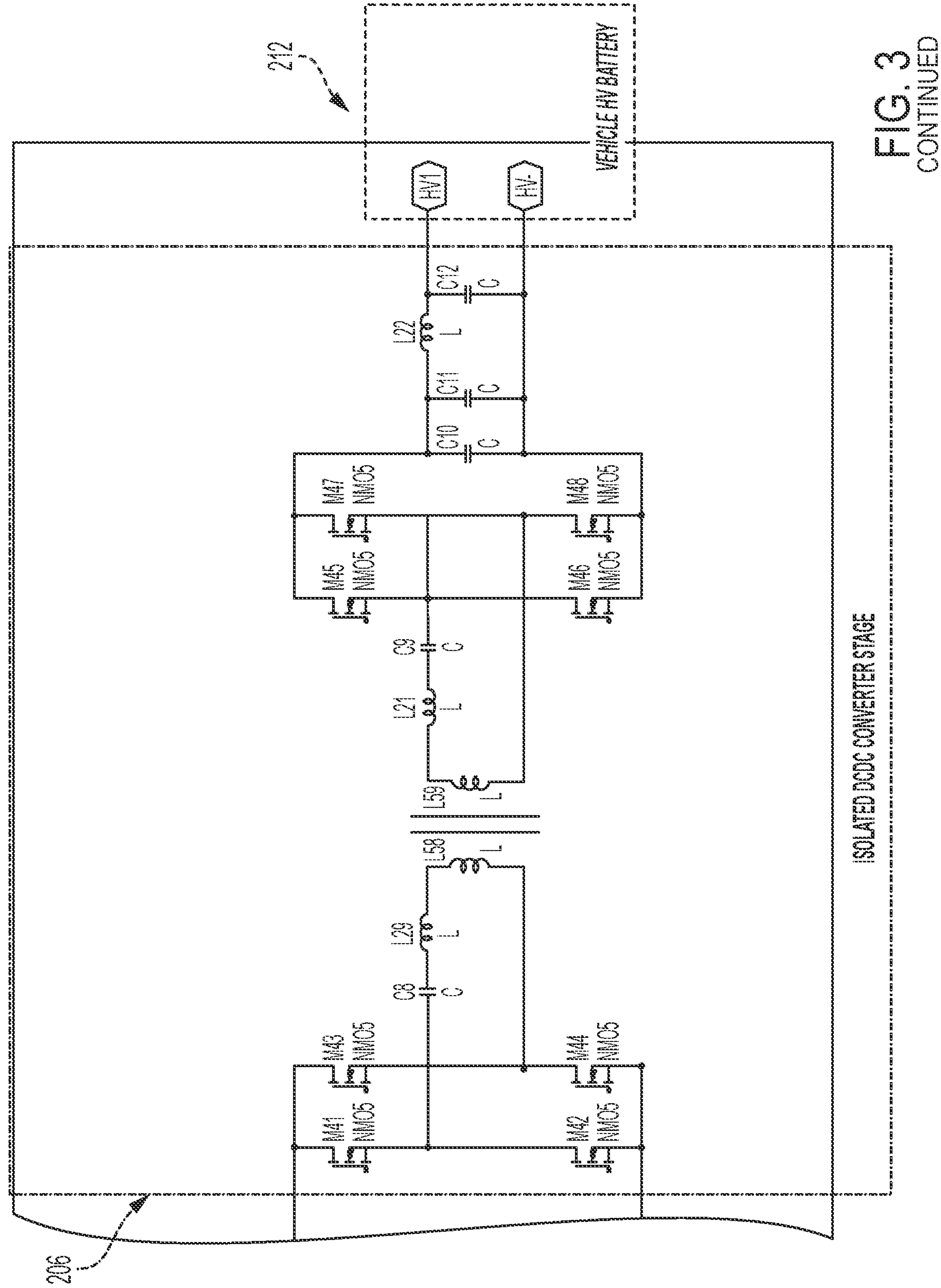
Figure 4:
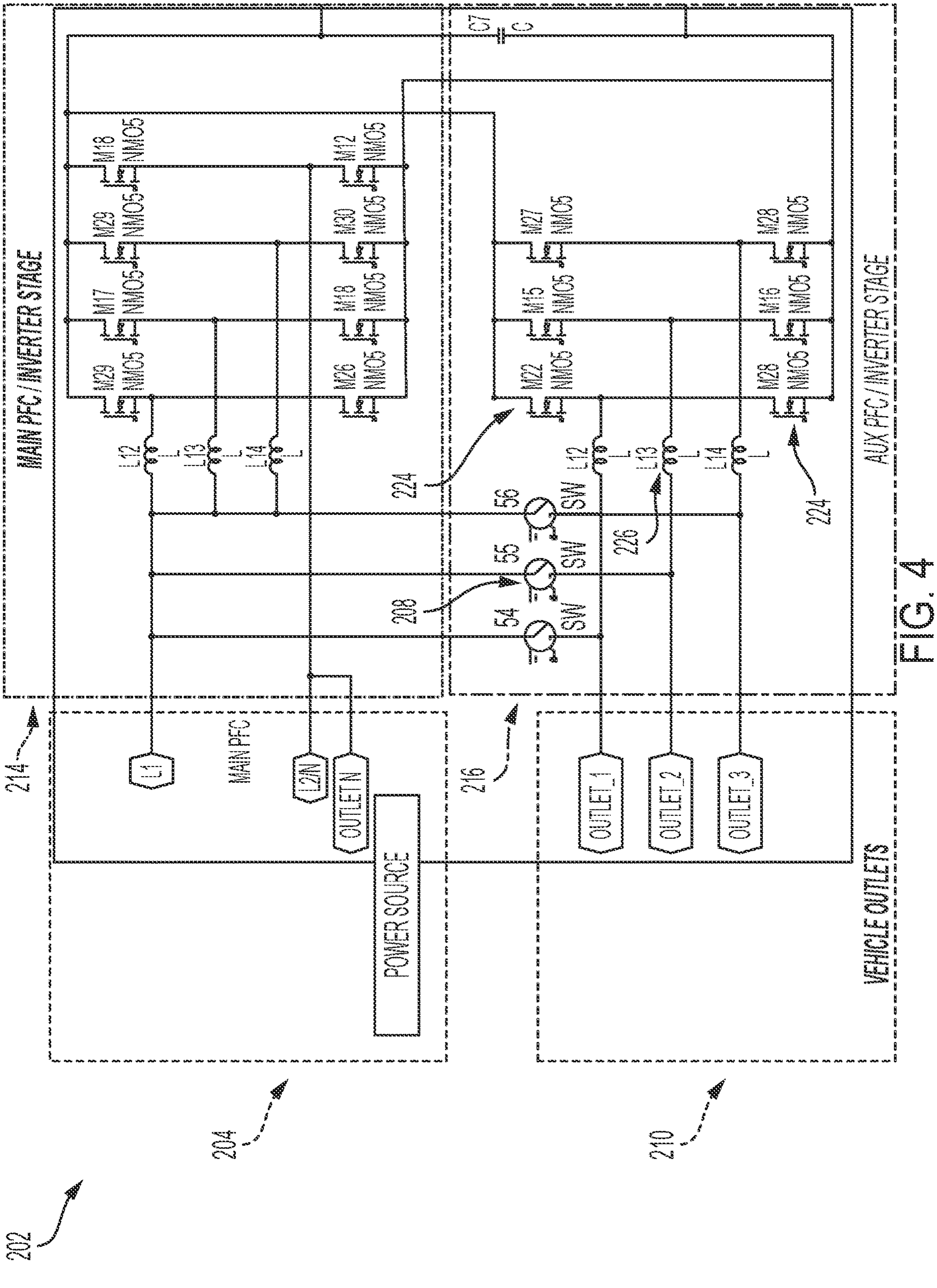
Figure 5:
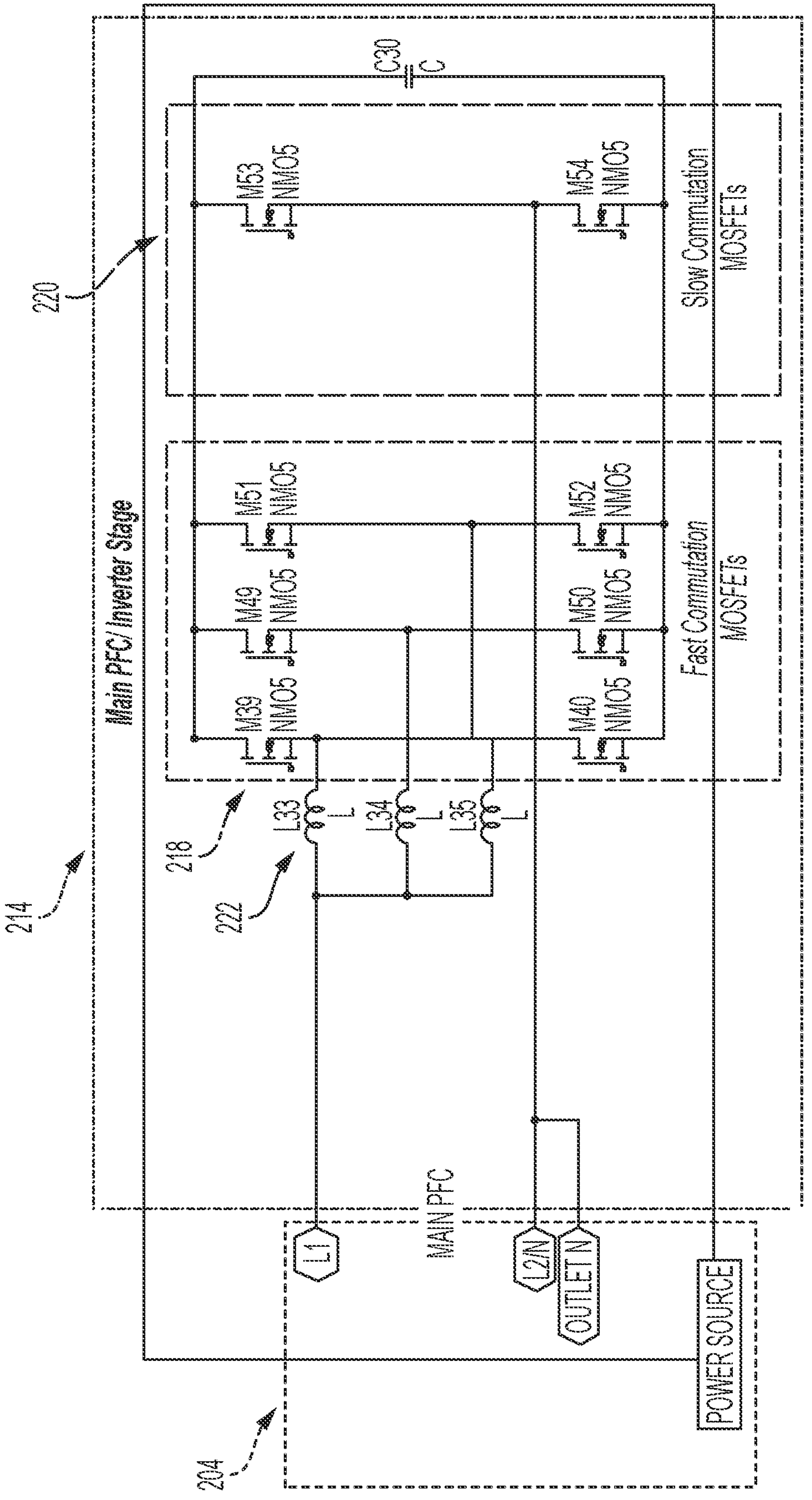
Figure 6:
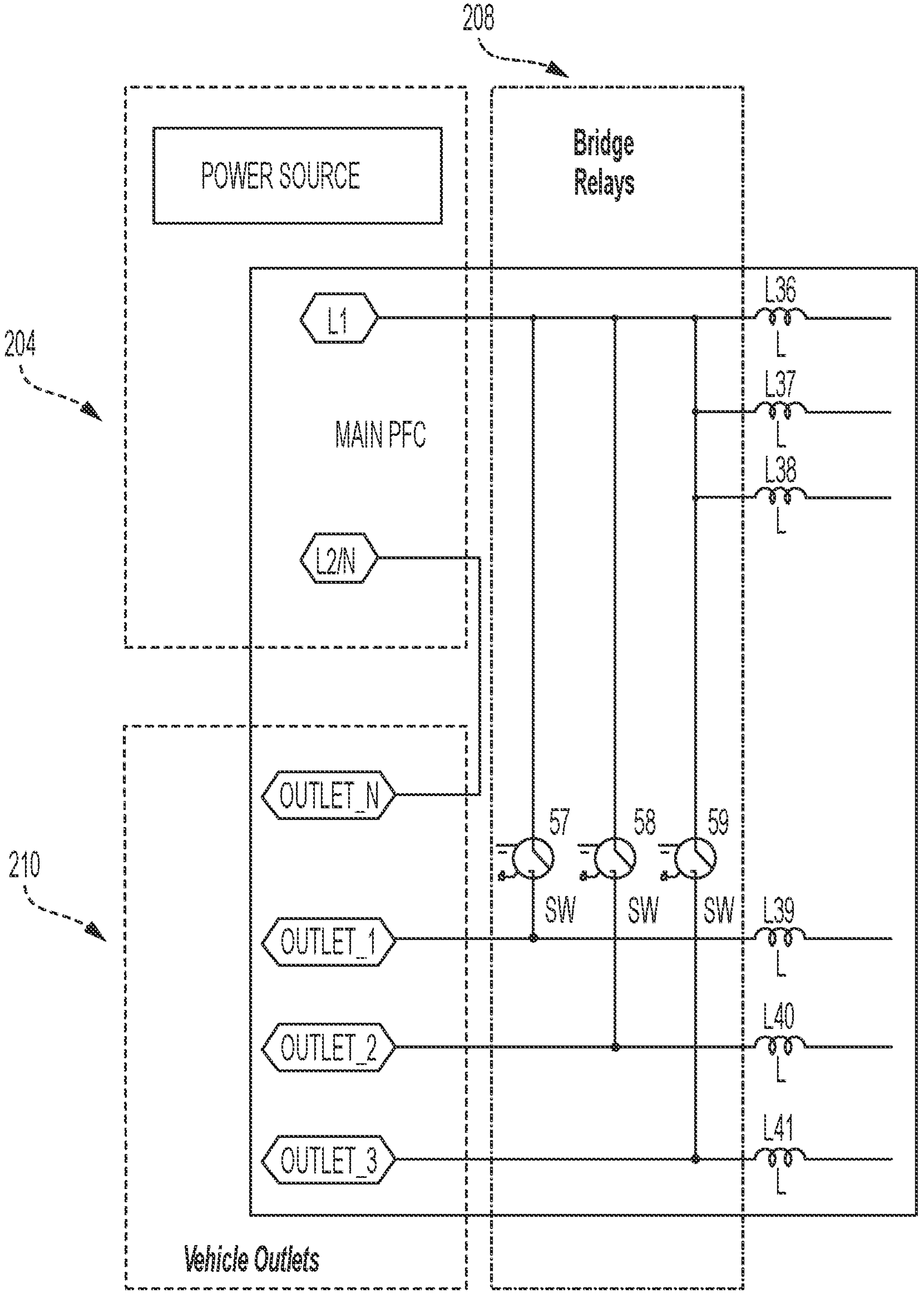

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10 and/or perform various aspects of the systems and methods described herein.

The controller 100 may be in communication with a charging circuit 200. With reference to FIGS. 3-6, the charging circuit 200 may be configured to charge at least one high voltage battery of the vehicle 10, a vehicle HV battery 212.

The charging circuit 200 may a power factor correction and inverter stage 202 electrically connected to a power source, such as an electrical grid and/or home power source 204. The power factor correction and inverter stage 202 may include one or more relays 208. The relays 208 may include any suitable relays, including, but not limited to, bridge relays. The charging circuit 200 may include an isolated direct current to direct current converter stage 206 configured to convert power from the power factor correction and inverter stage 202 and to provide the converted power to a load, such as the vehicle HV battery 212 or other suitable load.

The power factor correction and inverter stage 202 may include a main power factor correction and inverter stage 214 and an auxiliary power factor correction and inverter stage 216. The main power factor correction and inverter stage 214 may provide at least some of the power from the power source 204 to the isolated direct current to direct current converter stage 206. For example, the controller 100 may, based on a sensed charge of the vehicle HV battery 212, generate a charge command. The controller 100 may selectively instruct the main power factor correction and inverter stage 214 to provide power from the power source 204 to the isolated direct current to direct current converter stage 206. The isolated direct current to direct current converter stage 206 may be configured to convert the power from the power source and may charge the vehicle HV battery 212 using the converted power.

In some embodiments, the main power factor correction and inverter stage 214 includes one or more fast commutation MOSFETs 218 and one or more slow commutation MOSFETs 220. The MOSFETs 218 may be connected on a first side of the MOSFETs 218 to one or more inductors 222, which may be connected to the power source 204. The MOFESTs 218 may be connect on a second side of the MOSFETS 218 to the MOSFETS 220. The MOSFETS 220 may be connected to the isolated direct current to direct current converter stage 206.

The auxiliary power factor correction and inverter stage 216 may include a one or more MOSFETs 224. The one or more MOSFETs 224 may be connected on a first side of the MOSFETs 224 to one or more inductors 226, which may be connected to the relays 208 and the vehicle outlets 210. The MOSFETs 224 may be connected on a second side of the MOSFETs 224 to the isolated direct current to direct current converter stage 206.

In some embodiments, the controller 100 may be configured to selective position each relay 208 in a first state (e.g., an on state or open state) and a second state (e.g., an off state or closed state). For example, the controller 100 may receive sensor data from one or more sensors associated with the vehicle outlets 210. The sensor data may indicate that a load is present or connected to one or more of the vehicle outlets 210 (e.g., an electrical component, such as a laptop computer, mobile computing device, air compressor, and/or the like). Additionally, or alternatively, the controller 100 may receive a command indicating an amount of voltage to supply to the one or more vehicle outlets 210. The controller 100 may compare a sensed load at the one or more vehicle outlets 210 (e.g., and/or the voltage associated with the command) with a sensed voltage associated with the power source 204. If the controller 100 determines that the sensed voltage associated with the power source 204 is the same as the sensed load (e.g., and/or the voltage associated with the command) at the one or more vehicle outlets 210, the controller 100 may position the relays 208 in the second state to allow power from the power source 204 to flow directly to the one or more vehicle outlets 210.

Alternatively, if the controller 100 determines that the sensed voltage associated with the power source 204 is different than the sensed load at the one or more vehicle outlets 210, the controller 100 may position the relays 208 in the first state to allow the main power factor correction and inverter stage 214 and the auxiliary power factor correction and inverter stage 216 to provide at least some of the power from the power source 204 to at least one of the vehicle outlets 210. Additionally, or alternatively, based on a current charge of the vehicle HV battery 212 (e.g., being greater than a threshold) and the power source 204 being disconnected, the controller 100 may position one or more of the relays 208 in the first state. Responsive to at least one relay 208 being in the first state, the isolated direct current to direct current converter stage 206 and the auxiliary power factor correction and inverter stage 216 may provide at least some power from the vehicle HV battery 212 to at least one vehicle outlet 210.

Regardless of the state of the relays 208 and regardless of whether the voltage demand at the one or more vehicle outlets 210 (e.g., sensed at the one or more vehicle outlets 210 or associated with a command for voltage at the one or more vehicle outlets 210) is the same or different than the voltage associated with the power source 204, the isolated direct current to direct current converter stage 206 may operate to provide power from the power source 204 (e.g., via the main power factor correction and inverter stage 214 and/or the auxiliary power factor correction and inverter stage 216) to the HV battery 212 (e.g., to charge the HV battery 212). In some embodiments, a charging circuit includes a power factor correction and inverter stage electrically connected to a power source. The power factor correction and inverter stage includes a main power factor correction and inverter stage and an auxiliary power factor correction and inverter stage. The auxiliary power factor correction and inverter stage includes at least one relay. The charging circuit also includes an isolated direct current to direct current converter stage configured to convert power from the power factor correction and inverter stage and to provide the converted power to a load. The main power factor correction and inverter stage provides at least some of the power from the power source to the isolated direct current to direct current converter stage. Responsive to the at least one relay being in an open state, the main power factor correction and inverter stage and the auxiliary power factor correction and inverter stage provide at least some of the power from the power source to at least one power outlet.

In some embodiments, the power source includes an electrical power grid. In some embodiments, the load includes a vehicle battery. In some embodiments, the vehicle battery includes a high voltage vehicle battery. In some embodiments, the at least one power outlet includes at least one vehicle power outlet. In some embodiments, the main power factor correction and inverter stage includes at least one fast commutation metal-oxide-semiconductor field-effect transistor (MOSFET) and at least one slow commutation MOSFET. In some embodiments, responsive to the at least one relay being in a second state, the auxiliary power factor correction and inverter stage provides at least some power from the load to the at least one power outlet.

In some embodiments, a vehicle battery charging system includes a power factor correction and inverter stage electrically connected to a power source and including a main power factor correction and inverter stage and an auxiliary power factor correction and inverter stage. The auxiliary power factor correction and inverter stage includes at least one relay. The vehicle battery charging system also includes an isolated direct current to direct current converter stage configured to convert power from the power factor correction and inverter stage and to provide the converted power to a load. The main power factor correction and inverter stage provides at least some of the power from the power source to the isolated direct current to direct current converter stage. The vehicle battery charging system also includes a controller configured to selective position the at least one relay in a first state and a second state, wherein, responsive to the at least one relay being in the second state, and voltage at the power source being the same as a voltage demand at least one power outlet, the power from the power source is provided to at least one power outlet, and, responsive to the at least one relay being in the first state, the main power factor correction and inverter stage and the auxiliary power factor correction and inverter stage provide at least some power from the power source to the at least one power outlet.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. An electronic circuit comprising:

a power factor correction and inverter stage electrically connected to a power source, the power factor correction and inverter stage including at least one relay;

an isolated direct current to direct current converter stage configured to convert power from the power factor correction and inverter stage and to provide the converted power to a load, wherein the power factor correction and inverter stage is configured to selectively direct power from the power source to the isolated direct current to direct current converter stage and at least one power outlet; and a controller that, in response to determining that the at least one relay is in a first state, selectively control the main power factor correction and inverter stage and the auxiliary power factor correction and inverter stage to provide at least some of the power from the power source to the at least one power outlet.

2. The electronic circuit of claim 1, wherein the power source includes an electrical power grid.

3. The electronic circuit of claim 1, wherein the load includes a vehicle battery.

4. The electronic circuit of claim 3, wherein the vehicle battery includes a high voltage vehicle battery.

5. The electronic circuit of claim 1, wherein the at least one power outlet includes at least one vehicle power outlet.

6. The electronic circuit of claim 1, wherein the power factor correction and inverter stage includes a main power factor correction and inverter stage and an auxiliary power factor correction and inverter stage.

7. The electronic circuit of claim 6, wherein the main power factor correction and inverter stage provides at least some of the power from the power source to the isolated direct current to direct current converter stage.

8. The electronic circuit of claim 7, wherein the main power factor correction and inverter stage includes at least one fast commutation metal-oxide-semiconductor field-effect transistor (MOSFET).

9. The electronic circuit of claim 8, wherein the main power factor correction and inverter stage includes at least one slow commutation MOSFET.

10. The electronic circuit of claim 6, wherein the at least one relay is disposed in the auxiliary power factor correction and inverter stage.

11. The electronic circuit of claim 10, wherein, responsive to the at least one relay being in a second state and voltage associated with the power source is the same as a voltage demand at the at least one power outlet, voltage from the power source provide directly to the at least one power outlet.

12. A charging circuit comprising:

a power factor correction and inverter stage electrically connected to a power source and including a main power factor correction and inverter stage and an auxiliary power factor correction and inverter stage, the auxiliary power factor correction and inverter stage including at least one relay;

an isolated direct current to direct current converter stage configured to convert power from the power factor correction and inverter stage and to provide the converted power to a load, the main power factor correction and inverter stage provides at least some of the power from the power source to the isolated direct current to direct current converter stage; and a controller that, in response to determining that the at least one relay is in a first state, selectively control the main power factor correction and inverter stage and the auxiliary power factor correction and inverter stage to provide at least some of the power from the power source to the at least one power outlet.

13. The charging circuit of claim 12, wherein the power source includes an electrical power grid.

14. The charging circuit of claim 12, wherein the load includes a vehicle battery.

15. The charging circuit of claim 14, wherein the vehicle battery includes a high voltage vehicle battery.

16. The charging circuit of claim 12, wherein the at least one power outlet includes at least one vehicle power outlet.

17. The charging circuit of claim 12, wherein the main power factor correction and inverter stage includes at least one fast commutation metal-oxide-semiconductor field-effect transistor (MOSFET) and at least one slow commutation MOSFET.

18. The charging circuit of claim 12, wherein, responsive to the at least one relay being in a second state, the auxiliary power factor correction and inverter stage provides at least some power from the load to the at least one power outlet.

19. A vehicle battery charging system comprising:

a power factor correction and inverter stage electrically connected to a power source and including a main power factor correction and inverter stage and an auxiliary power factor correction and inverter stage, the auxiliary power factor correction and inverter stage including at least one relay;

an isolated direct current to direct current converter stage configured to convert power from the power factor correction and inverter stage and to provide the converted power to a load, wherein the main power factor correction and inverter stage provides at least some of the power from the power source to the isolated direct current to direct current converter stage; and a controller configured to selective position the at least one relay in a first state and a second state, wherein, the controller in response to a determination that the at least one relay is in the second state, and voltage at the power source is the same as a voltage demand at least one power outlet, selectively direct the power from the power source to at least one power outlet, and, in response to a determination that the at least one relay is in the first state, selectively control the main power factor correction and inverter stage and the auxiliary power factor correction and inverter stage to provide at least some power from the power source to the at least one power outlet.

* * * * *